June 24, 1947. E. E. WENDT 2,422,996
COVER APPLIER
Filed Sept. 1, 1944 9 Sheets-Sheet 4

Inventor:
Elmer E. Wendt
By: Lee J. Gary
Attorney

June 24, 1947. E. E. WENDT 2,422,996
COVER APPLIER
Filed Sept. 1, 1944 9 Sheets-Sheet 6

Inventor:
Elmer E. Wendt
By Lee J. Gary
Attorney

Patented June 24, 1947

2,422,996

UNITED STATES PATENT OFFICE 2,422,996

COVER APPLIER

Elmer E. Wendt, Hinsdale, Ill., assignor to W. F. Hall Printing Company, Chicago, Ill., a corporation of Illinois Application September 1, 1944, Serial No. 552,363

17 Claims. (Cl. 11—4)

This invention relates to apparatus for gluing covers to books and is more particularly concerned with apparatus in which the covers may be glued to the back edges of books and also to the sides thereof, if desired.

Briefly, this invention comprises a feed mechanism for delivering one cover at a time from a cover supply table to a cover aligning conveyor where the covers are arranged in parallel alignment against a guide plate for delivery to a timing mechanism. The timing mechanism comprises a plurality of wheels arranged to move the covers through an arc of 180° from the cover conveyor to a book conveyor, where the covers are pressed into engagement with the glue coated back edges of books. An auxiliary gluing mechanism is associated with the timing mechanism and is operable when desired for applying spaced parallel rows of glue to the covers for securing the same to the sides of books.

An object of the present invention is to provide a simple and reliable means for receiving and arranging covers in parallel alignment for delivery to the timing mechanism.

A further object of this invention is to provide an improved timing mechanism for accurately positioning covers on the backs of books, and contemplates the provision of a mechanism which may be readily adjusted for use with books and covers of various sizes.

This invention further contemplates the provision of a novel glue applying means associated with the timing wheel and adapted for use in book constructions in which the covers are glued to the sides of books. This glue applying means includes a pair of gluing wheels secured in spaced relation on a shaft journaled in a pivotally mounted bracket. The wheels are formed with circumferential gluing portions of predetermined length for providing a pair of spaced parallel glue surfaces on the covers for the attachment of same to the sides of books. In the event the timing wheel should be rotated without covers mounted thereon for gluing, means have been provided to automatically move the gluing wheels away from the timing wheel to prevent an application of glue thereon.

This invention embodies other novel features, details of construction and arrangement of parts which are hereinafter set forth in the specification and claims and illustrated in the accompanying drawings, wherein:

In the drawings, the apparatus is shown as comprising generally a cover feed mechanism 25, a cover conveyor 26, a timing mechanism 27, a glue applying mechanism 28, and a book conveying and gluing mechanism 29.

*Cover feed mechanism*

Figs. 1, 2 and 14 to 19 show a cover feed mechanism 25 for transferring book covers 30 at predetermined intervals from a table 31 to a cover conveyor mechanism 26. The feed mechanism comprises a suction head 32 connected to the lower end of a rocker arm 33. A bifurcated bearing bracket 34 is secured by means of rivets to the upper end of the rocker arm for pivotal connection at 35 with a lift arm 36. A roller 37 is journaled on the rocker arm 33 and intermediate the ends thereof for engagement by a cam 38 secured to a shaft 39 journaled on a frame 42. The lift arm 36 is pivotally mounted on a bearing rod 41 secured to the frame 42, and has a roller 43 journaled in its free end for engagement by a cam 44 secured on the shaft 39.

The suction head 32 is adjustably connected to the rocker arm 33 by means of a slot 46 and a bolt 47, and is provided with an air passage 48 for connection with a flexible conduit 49 which has its other end connected to a vacuum passage 51 (Fig. 18) formed in a manifold 52. The vacuum passage 51 extends radially at 53 and axially at 54 and 56 to terminate at the face 57 (Fig. 17) of the manifold. An air passage 58 and a pump passage 59 are also formed in the manifold 52 and disposed on opposite sides of the vacuum passage 51, as viewed in Fig. 18, and extend axially at 61 and 62, respectively, to terminate at the face 57. The manifold 52 is slotted at 63 to receive screws 64 threaded into the frame 42, and is bored to receive the shaft 39 and a shaft bearing 65.

Figure 17:
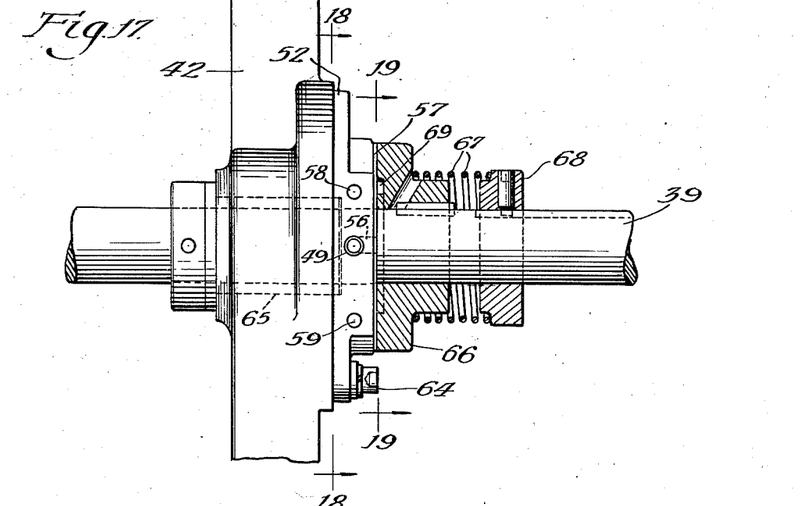
Fig. 17 is a fragmentary elevational view, partly in section, showing the air control means employed with the cover feed mechanism.
Figure 18:
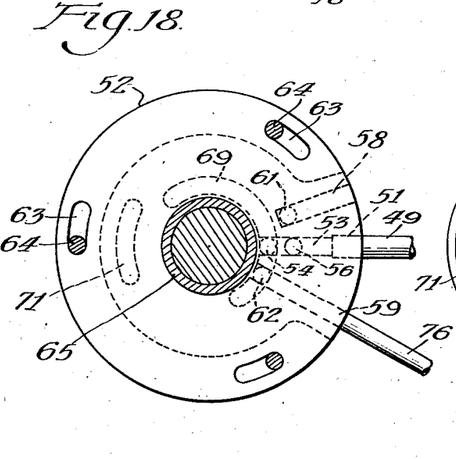
Fig. 18 is a sectional view taken along the line 18—18 of Fig. 17.
Figure 19:
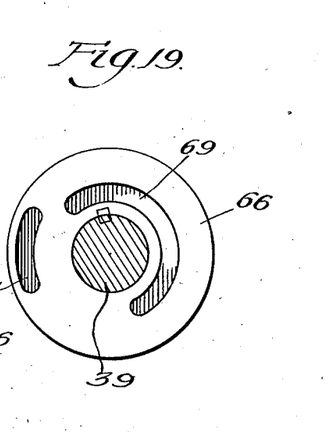
Fig. 19 is a view taken along the line 19—19 of Fig. 17.

A commutator plate 66 is keyed to the shaft 39 to prevent relative rotational movement but to permit relative axial movement, and is held in frictional engagement with the face 57 of the manifold 52 by means of a compression spring 67 and a collar 68 secured to the shaft 39. A pair of arcuate grooves 69 and 71 are formed in the face of the plate 66 for registry with the passages formed in the manifold 52, the passages 54 and 62 being disposed to register with the groove 69, and the passages 61 and 56 being arranged to register with groove 71.

A pair of feed rolls 72 (Figs. 1, 14 and 15) are secured to the shaft 39 to coact with driven rolls 73 which are secured to a shaft 74 journaled on the frame 42. The feed rolls 72 have a reduced diameter at 75 (Fig. 14) to permit insertion of covers at timed intervals between same and the driven rolls 73.

Figures 14, 16:
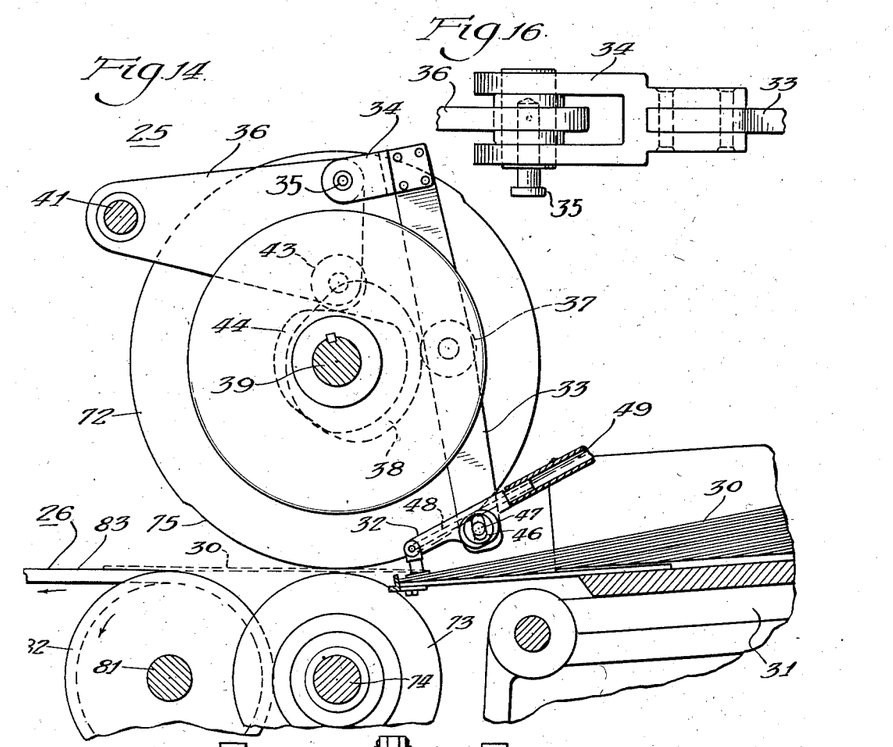
Fig. 14 is a fragmentary sectional view taken along the line 14—14 of Fig. 15, showing a cover feed mechanism.
Fig. 16 is a fragmentary detail view showing a link connection employed in the feed mechanism.
Figure 15:
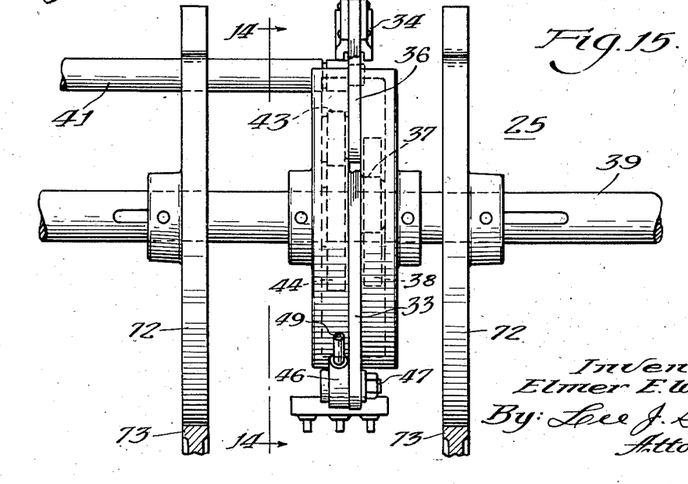
Fig. 15 is an end elevational view of same.

In the operation of the feed mechanism thus described, the suction head 32 is moved, from its position shown in Fig. 14, upwardly by means of the cam 44 and then forwardly by means of the cam 38 to carry a cover 30 between the rolls 72 and 73. The covers are held on the suction head 32 by the action of an air pump (not shown) which is connected at its inlet end to the passage 59 by a conduit 76 (Fig. 18) to draw air therethrough. The pump thus acts to form a vacuum in the suction head passage 48 when same is closed by a cover 30, and when the groove 69 is in registry with the passages 62 and 54. When the suction head 32 is in its forward position for the release of a cover 30, the groove 71 is moved into registry with the passages 61 and 56 to permit the passage of air from the passage 58 into the passage 51 and then through the conduit 49 to the suction head 32. The commutator plate 66 thus acts to alternately create and break a vacuum within the suction head 32. The shaft 39 is driven in timed relation with the other parts of the apparatus hereinafter described.

Cover conveyor

Figure 1:
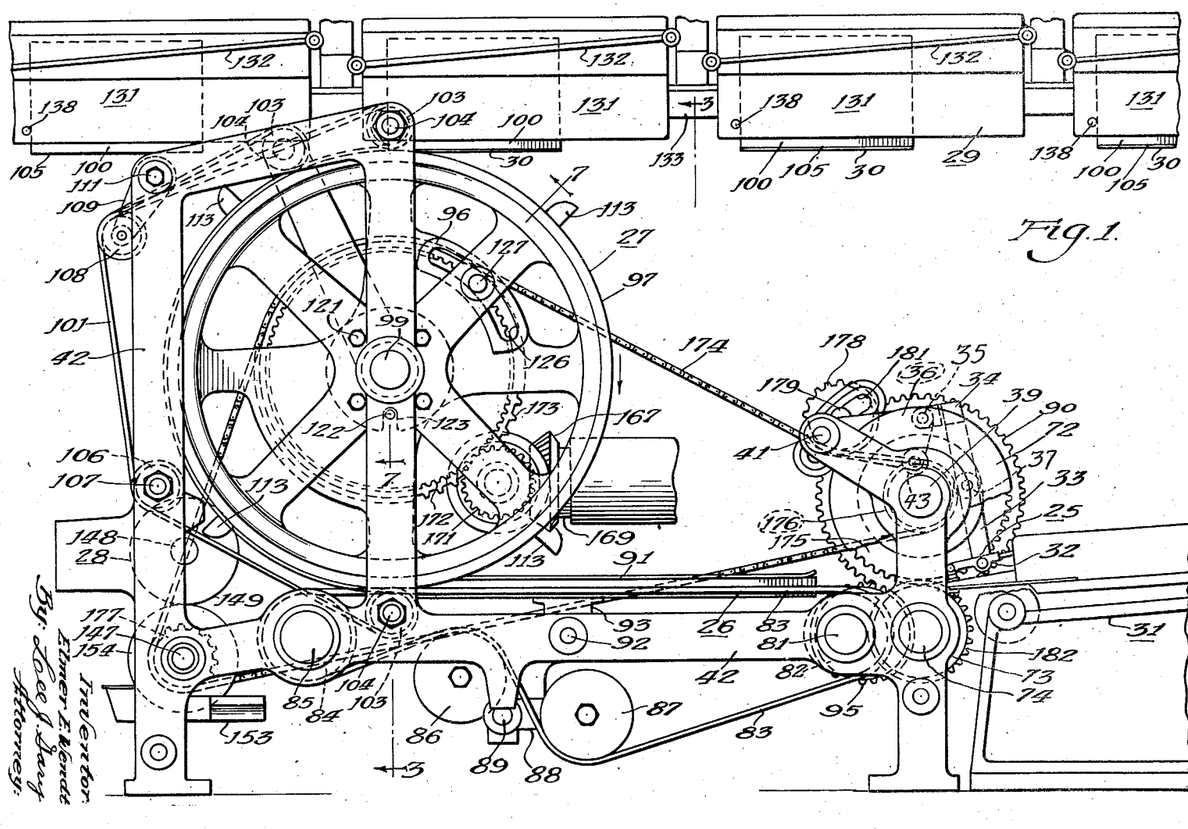
Fig. 1 is a side elevational view showing a gluing apparatus embodying features of this invention.
Figure 2:
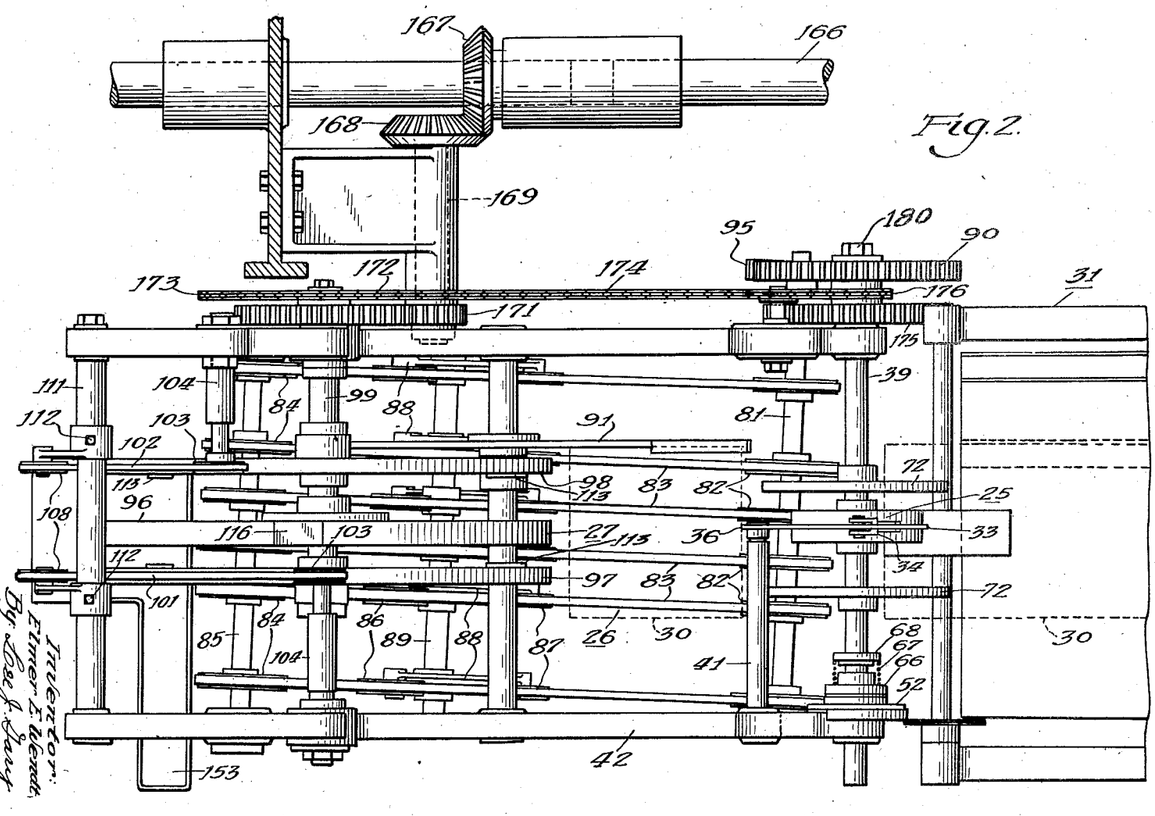
Fig. 2 is a plan view of same.

The rolls 72 and 73 move the covers 30 onto a cover conveyor 26, Figs. 1 and 2, comprising a driving shaft 81 having drive pulleys 82 secured thereon for moving the endless belts 83 to convey the covers toward the timing mechanism 27. The endless belts pass around pulleys 84 secured on a shaft 85 and are tensioned by means of idler pulleys 86 and 87 journaled on bearing brackets 88. The shafts 81 and 85 are journaled in the frame 42, and the bearing brackets 88 are journaled on a shaft 89 and pivotally movable toward their tensioning position and then clamped against further movement by means of set screws.

A cover guide plate 91 is mounted on a cross shaft 92 by means of a bracket 93 and is disposed in parallel alignment with the timing mechanism 27. As shown in Fig. 2, the endless belts 83 are disposed at an angle to the cover guide plate 91 and act to move and to hold covers in parallel alignment against same prior to their engagement by the timing mechanism. The feed mechanism 25 and cover conveyor 26 are driven in timed relation by means of meshing gears 90 and 95 secured to the shafts 39 and 81, respectively. The cover guide plate 91 may be adjusted laterally on the cross shaft 92 to accommodate covers of different sizes.

Timing mechanism

The timing mechanism 27 comprises a timing wheel 96 and a pair of cover carrier wheels 97 and 98 disposed on opposite sides of the timing wheel 96. These wheels are adjustably mounted on a timing shaft 99 journaled on the frame 42 and act to receive and convey the covers 30 from the cover conveyor 26 to the book conveyor 29. The covers are held in engagement against the carrier wheels 97 and 98 by means of endless belts 101 and 102, respectively. Each belt extends around a pair of pulleys 103 journaled on stud shafts 104 secured to the frame 42 and disposed on substantially diametrically opposed sides of the carrier wheels 97 and 98. The covers 30 are thus moved through an arc of 180° to reverse their direction of travel. The return sides of the belts 101 and 102 are engaged by pulleys 106 journaled on stud shafts 107 secured to the frame 42, and are also engaged by tension rolls 108 which are journaled on brackets 109. The brackets 109 are pivotally adjusted on a cross shaft 111 by means of set screws 112.

A plurality of stop lugs 113 are mounted on the carrier wheels 97 and 98 by means of screws 114 and are equidistantly spaced about the outer periphery thereof for abutting engagement with the covers 30 as they leave the conveyor 26. The outer periphery of the timing wheel 96 is formed with a plurality of transversely extending grooves 116 to receive glue drippings.

Figure 7:
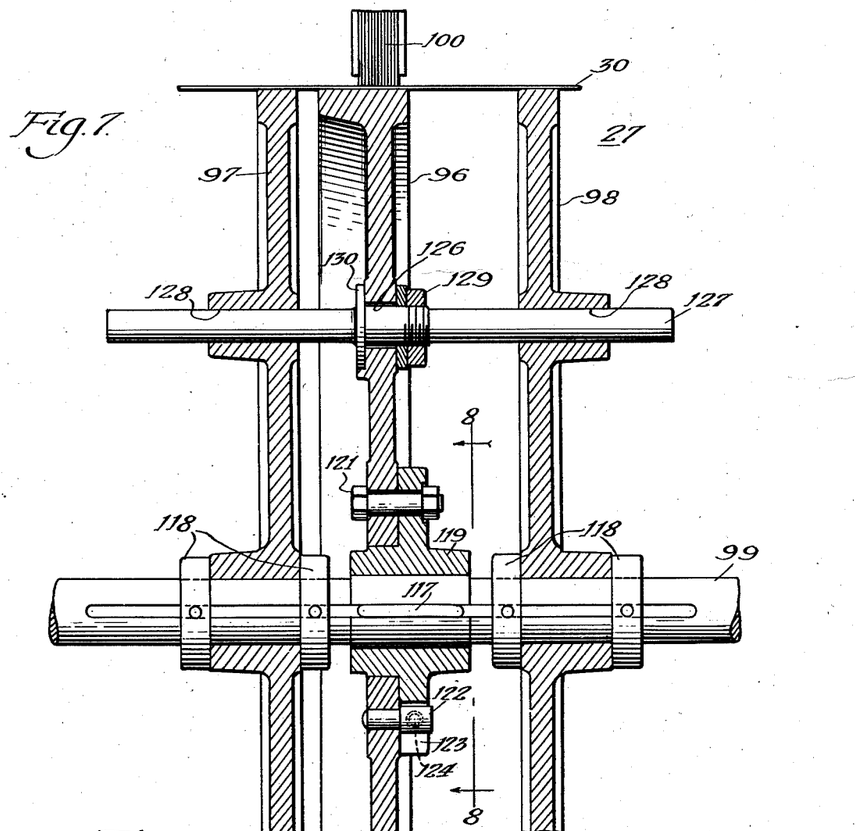
Fig. 7 is a fragmentary transverse sectional view taken along the line 7—7 of Fig. 1.
Figure 8:
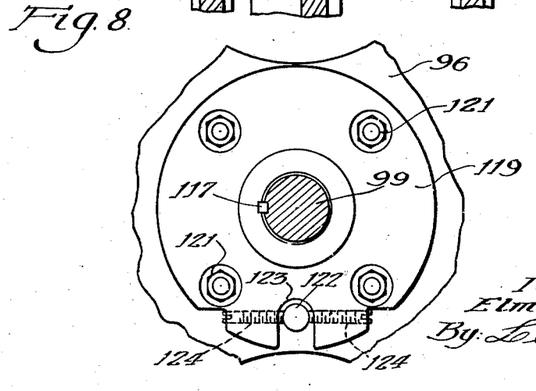
Fig. 8 is a detail sectional view taken along the line 8—8 of Fig. 7.

Figs. 7 and 8 of the drawings, disclose the manner in which the timing wheel 96 and carrier wheels 97 and 98 are mounted on the shaft 99. The timing wheel 96 is secured against rotational movement by a key 117, and the carrier wheels 97 and 98 are adjustably positioned axially by means of the stop collars 118. The timing wheel 96 is provided with a hub 119 detachably connected thereto by means of bolts 121. A pin 122 is mounted on the timing wheel 96 and projects through a recess 123 formed in the hub 119 for engagement by a pair of adjustment screws 124 for adjusting the position of the wheel 96 with respect to its hub. The timing wheel 96 is also formed with a slot 126 to receive a coupling shaft 127 having its ends snugly engaged for axial adjustment in apertures 128 formed in the carrier wheels 97 and 98. The coupling shaft 127 is secured to the timing wheel 96 by means of a nut 129 and shoulder 130. The timing shaft 99 turns in timed relation with the movement of the book carrier 29, and the position of the carrier wheels 97 and 98 are rotationally adjustable on the timing shaft 99 to adjust the positions of the stop lugs 113 with respect to the books 109 carried by the book carrier 29. In making this adjustment, the nut 129 is loosened to move the carrier wheels 97 and 98 around the shaft 99. When the machine is being assembled, it is necessary to have the forward edge of the slots 116 disposed for travelling alignment with the back edges of the books to be covered and this is accomplished by means of the adjustment screws 124.

Book conveyor

Figure 3:
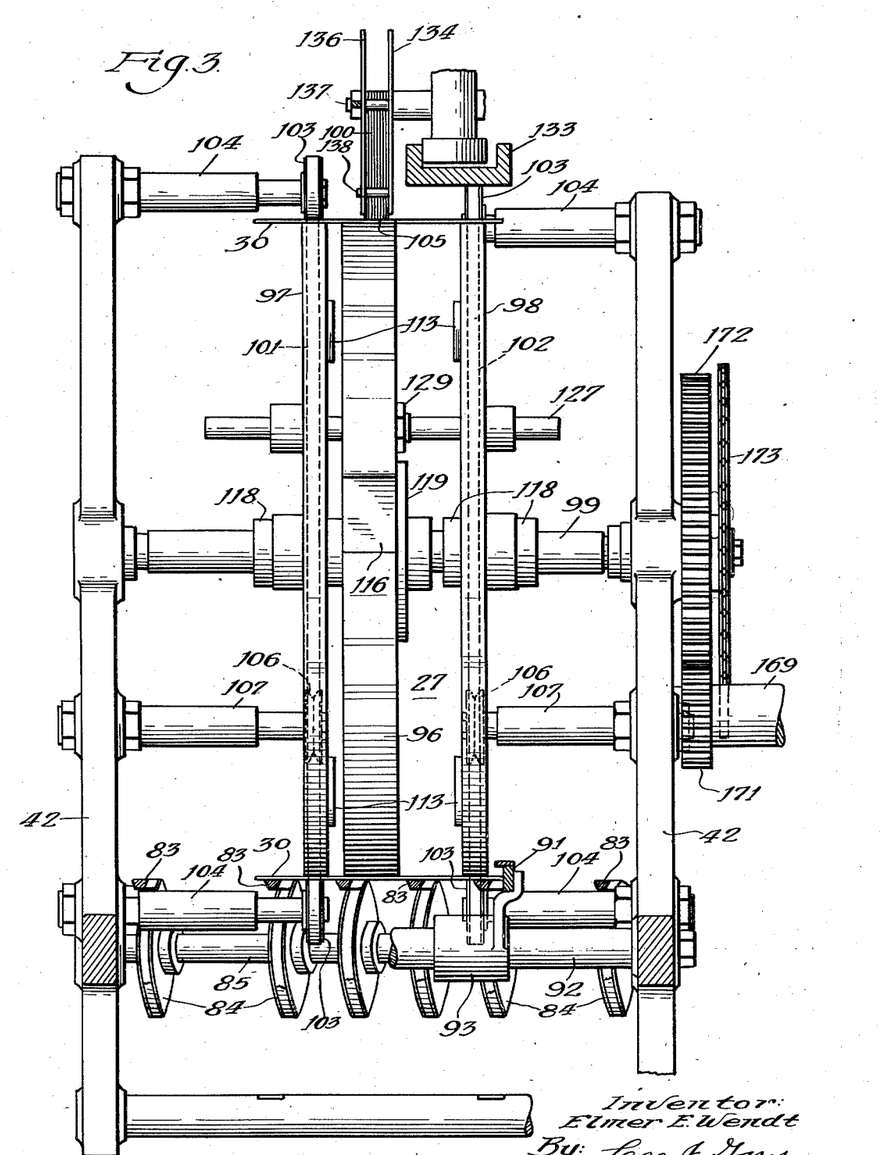
Fig. 3 is a transverse sectional view taken along the line 3—3 of Fig. 1.
Figures 4, 6:
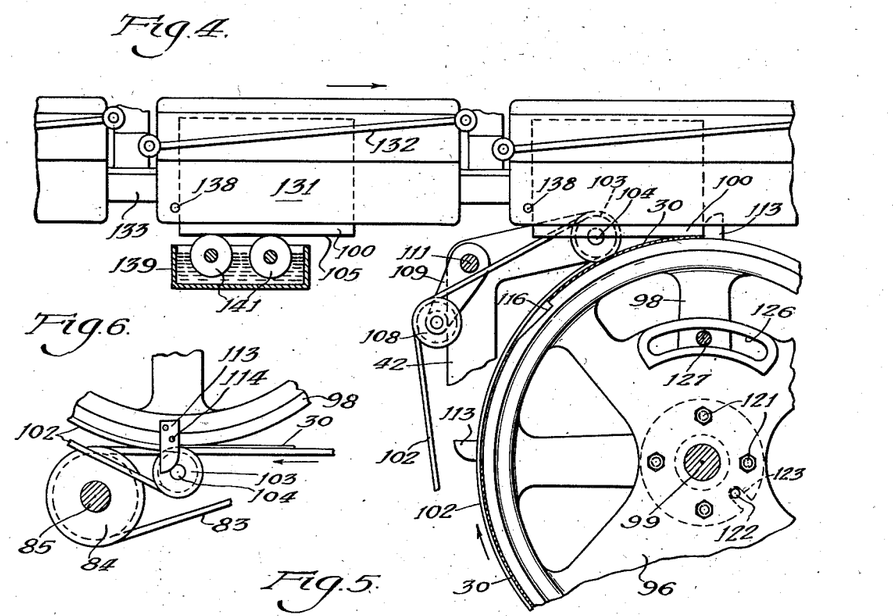
Fig. 4 is a fragmentary sectional view showing a book and book cover being brought into alignment for assembly.
Fig. 6 is a fragmentary sectional view showing a book cover being transferred from a cover conveyor to a timing wheel.
Figure 5:
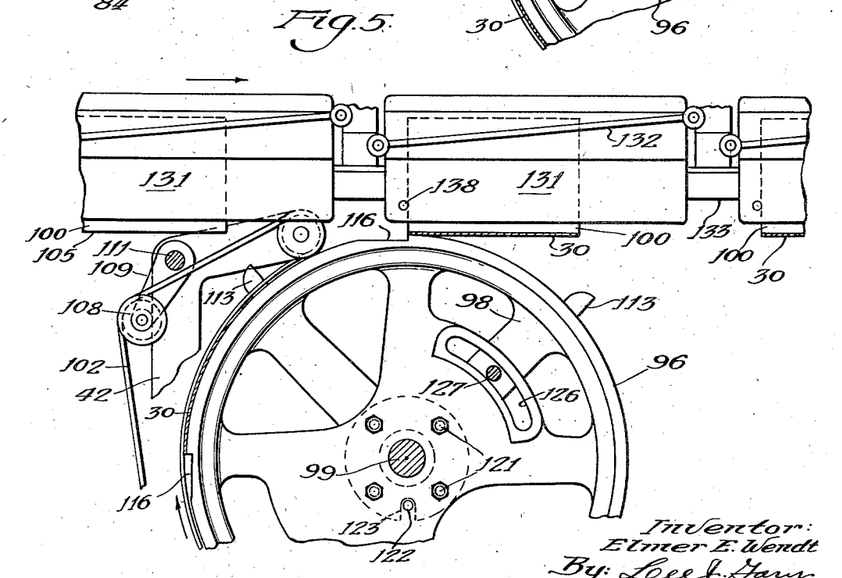
Fig. 5 is a fragmentary sectional view showing the arrangement of parts at the completion of the operation of gluing a cover to the back edge of a book.

The book conveyor 29 comprises a series of similar book engaging units 131 united by means of connecting links 132 to form an endless conveyor for movement along a track 133. The several units 131 embody a pair of clamping plates 134 and 136 (Fig. 3), the plates 136 being laterally movable with respect to the plates 134 and guided by means of clamping bolts 137 and alignment pins 138. As shown in Fig. 4, the backs 105 of the books 100 are coated with glue by means of a pair of gluing rolls 141 journaled in a glue reservoir 139. The books 100, with glue thus applied to the backs 105 thereof, are carried by the book conveyor 29 through a path such that the backs 105 are disposed substantially tangent to the outer periphery of the timing wheel 96.

Auxiliary gluing mechanism

Figures 9, 10, 11, 12:
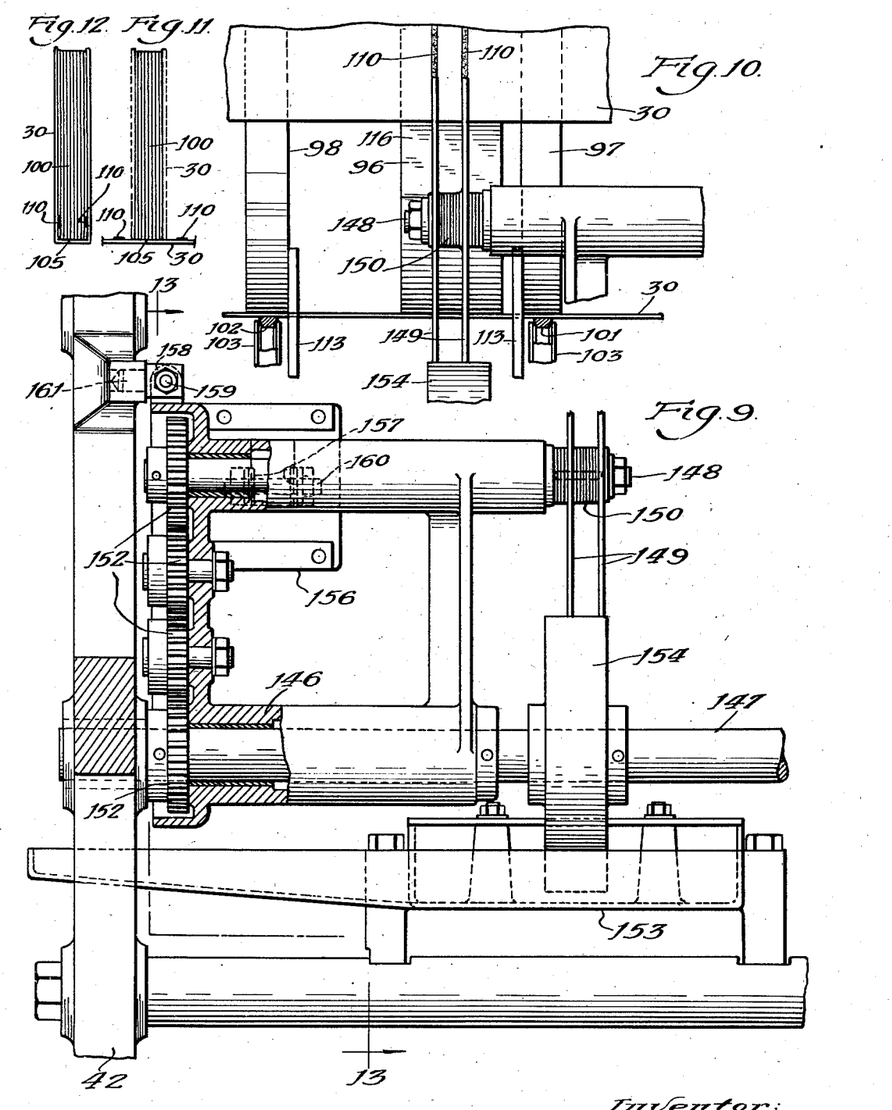
Fig. 9 is a fragmentary transverse sectional view showing a glue applying means which is employed for forming a pair of spaced parallel glue surfaces on book covers.
Fig. 10 is a fragmentary transverse sectional view showing same as it appears when viewed from the back end of the apparatus.
Fig. 11 is a detail and elevational view showing a cover glued in position to the back edge of a book.
Fig. 12 is a detail end elevational view of same in which the sides of the cover have been moved into glued engagement with the sides of the book.
Figure 13:
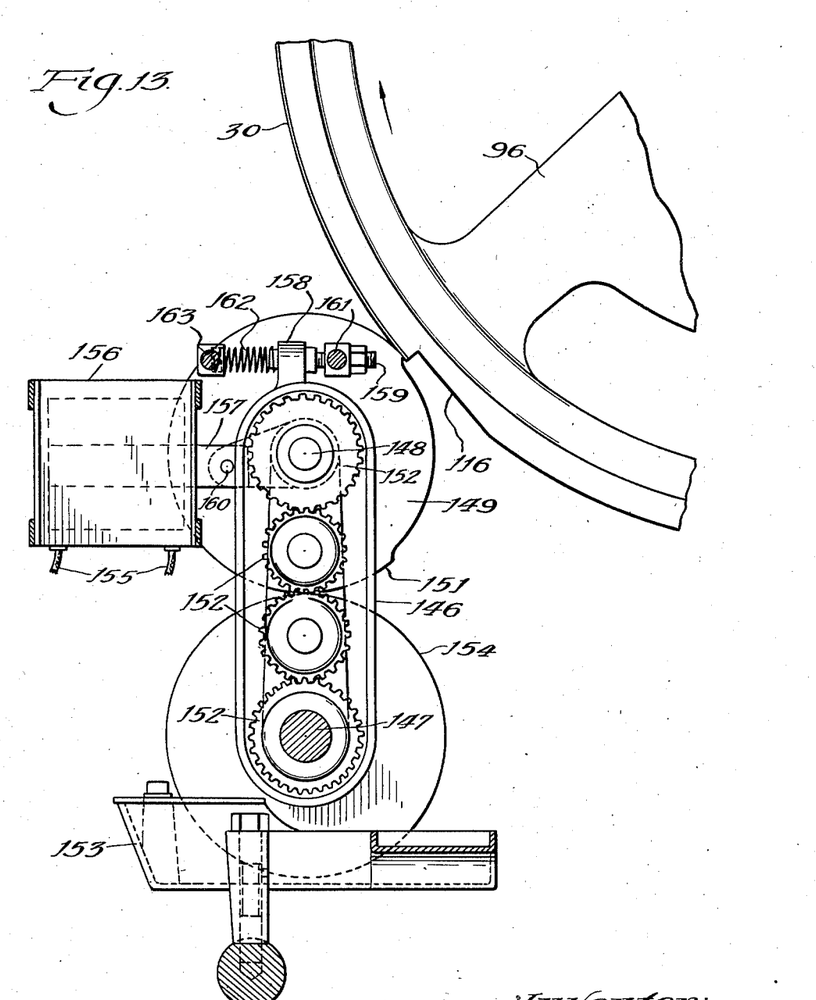
Fig. 13 is a fragmentary sectional view taken along the line 13—13 of Fig. 9.

Figs. 1, 9, 10 and 13 show an auxiliary gluing mechanism 28 comprising a roll carrier frame 146 journaled for pivotal movement on a driving shaft 147 which, in turn, is journaled on the frame 42. A driven shaft 148 is journaled on the free end of the frame 146 and has a pair of gluing rolls 149 secured thereon for applying spaced parallel rows of glue 110 to the covers 30, as illustrated in Figs. 10, 11 and 12. As shown in Fig. 13 the rolls 149 are formed with a circumferential gluing surface 151 of predetermined length. The spacing of the rolls 149 may be varied by adding or removing spacing collars 150. The shaft 148 is driven from the shaft 147 through a train of gears 152, and glue is supplied from a glue reservoir 153 to a roll 154 and thence to the surface 151 of the gluing rolls 149.

In the event a cover 30 is not in position on the timing mechanism 27 for gluing, means have been provided for automatically pivoting the frame 146 to move the rolls 149 away from the timing wheel 96. This means preferably comprises a solenoid coil 156 mounted on the frame 42 and having an armature 157 pivotally connected at 160 to the frame 146. A circuit 155 to the solenoid 156 may be completed by means of a trip switch, electric eye, or the like (not shown) arranged for actuation by covers 30 on the timing mechanism 27. A lug 158 is formed on the frame 146 for engagement against an adjustable stop screw 159 which is threaded through a pin 161 secured to the frame 42. A compression spring 162 is interposed between a pin 163 provided on the frame 42 and the lug 158 to hold the frame 146 in its forward position and to yieldably resist rearward movement thereof.

Drive mechanism

The drive mechanism for the apparatus thus described comprises a power shaft 166 (Fig. 2) which acts through a pair of bevel gears 167 and 168, a shaft 169, and spur gears 171 and 172 on the shafts 169 and 99, respectively, to drive the timing mechanism 27 in the direction indicated by the arrows to carry covers 30 from the cover conveyor 26 into position for gluing engagement with the backs 105 of the books 100. The power shaft 166 is also employed to drive the book conveyor 29 through any suitable transmission means (not shown) and at a linear speed corresponding to the peripheral speed of the timing wheel 96 and carrier wheels 97 and 98.

A driving sprocket 173 is secured to the timing shaft 99 and acts through a sprocket chain 174 to drive a sprocket 176 frictionally engaged between gears 90 and 175 keyed to the shaft 39, and a sprocket 177 secured to the shaft 147, thus actuating the feed mechanism 25 and the glue rolls 149. The feed mechanism 25 is adjusted for timed movement with the other parts of the machine by loosening the nut 180 and then adjusting the sprocket 176 with respect to the gears 90 and 175. Any slack in the chain 174 is taken up by an idler sprocket 178 journaled on a stud shaft 179 which is adjustably mounted in a slot 181 formed in the frame 42 to effect driving of the rolls 73 which cooperate with the feed rolls 72. A gear 182 is keyed to the shaft 74 to mesh with and be driven by the gear 175 keyed to the shaft 39.

General operation of the machine

In the operation of the machine thus described, covers 30 are lifted from the supply table 31 by the suction head 32 and inserted between the feed rolls 72 and 73 for delivery onto the belts 83 of the cover conveyor 26. The belts 83 then act to move the covers into parallel alignment against the guide plate 91, and then against the abutment lugs 113 provided on the carrier wheels 97 and 98. The covers 30 are held in position on the carrier wheels 97 and 98 and timing wheel 96 throughout an arcuate travel of 180° to bring same into aligning gluing engagement with the back edges 105 of the books 100 carried by the book conveyor 29 in tangential relation to the periphery of the timing wheel 96 to complete the operation of gluing covers to the back edges only of books.

It is also common practice to glue the covers to the sides of books, in addition to the back edge engagement, as illustrated in Figs. 11 and 12, in which event the gluing mechanism 28 is employed to apply a pair of parallel rows of glue 110 to the covers 30 as they are being carried toward the book conveyor 29. After engagement of the covers 30 to the back edges 105 of the books, as shown in Fig. 11, the covers are folded manually or otherwise for gluing attachment to the sides of the books, as illustrated in Fig. 12.

While this invention has been shown in but one form it is obvious to those skilled in the art that it is not so limited but is susceptible of various changes and modifications without departing from the spirit thereof or the scope of the appended claims.

I claim as my invention:

1. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, and endless belts for holding covers in position upon said cover carrier wheels prior to mounting of said covers upon the exposed backs of the books by means of said timing wheel.

2. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, and means for adjusting the positions of said stop lugs with respect to their respective drip grooves to accommodate covers of different lengths.

3. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, said cover carrier wheels being rotationally adjustable with respect to said timing wheel to receive covers of different lengths between the stop lugs on the cover carrier wheels and the drip grooves on the timing wheel.

4. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, and means for adjusting the positions of said cover carrier wheels axially with respect to said timing wheel to accommodate covers of different widths.

5. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, means for adjusting the positions of said stop lugs with respect to the drip grooves provided on said timing wheel to accommodate covers of different lengths, and means for adjusting the positions of said cover carrier wheels axially with respect to said timing wheel to accommodate covers of different widths.

6. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, means for adjusting the positions of said stop lugs with respect to the drip grooves provided on said timing wheel to accommodate covers of different lengths, means for adjusting the positions of said cover carrier wheels axially with respect to said timing wheel to accommodate covers of different widths, and means for applying glue to the exposed backs of books to be covered.

7. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, and means provided on said timing wheel for driving engagement with said cover carrier wheels.

8. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, and a coupling shaft mounted on said timing wheel for driving said cover carrier wheels.

9. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, and a coupling shaft adjustably mounted on said timing wheel for driving said cover carrier wheels.

10. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, a coupling shaft mounted on said timing wheel for driving said cover carrier wheels, and means for rotationally adjusting said timing wheel upon said timing shaft.

11. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, a cover guide plate for aligning the covers for delivery to said cover carrier wheels, and a cover conveyor coacting with said guide plate and disposed at an angle thereto.

12. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, a cover guide plate for aligning the covers for delivery to said cover carrier wheels, a cover conveyor coacting with said guide plate and disposed at an angle thereto, and means for adjusting said guide plate laterally with respect to said timing wheel and cover carrier wheels to accommodate covers of different widths.

13. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, means arranged to apply glue to the backs of uncovered books conveyed by said book conveyor, and means coacting with said timing wheel for applying parallel rows of glue to covers carried by said carrier wheel for securing said covers to opposite sides of said books.

14. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, means arranged to apply glue to the backs of uncovered books conveyed by said conveyor, and a pair of gluing rolls coacting with said timing wheel for applying parallel rows of glue to covers carried by said carrier wheels for securing said covers to opposite sides of books.

15. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, a driving shaft, a roll frame journaled on said driving shaft, a driven shaft journaled on the free end of said roll frame, a pair of gluing rolls secured to said driven shaft arranged to apply parallel rows of glue to covers carried by said carrier wheels, means for driving said driving shaft in timed relation with said timing shaft, and means for driving said driven shaft from said driving shaft.

16. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges or covers, endless belts for holding covers in position upon said cover carrier wheels prior to mounting of said covers upon the exposed backs of the books by means of said timing wheel, a driving shaft, a roll frame journaled on said driving shaft, a driven shaft journaled on the free end of said roll frame, a pair of gluing rolls secured to said driven shaft arranged to apply parallel rows of glue to covers carried by said carrier wheels, means for driving said driving shaft in timed relation with said timing shaft, means for driving said driven shaft from said driving shaft, and means for pivoting said roll frame on said driving shaft to move said gluing wheels into and out of operative position with respect to said timing wheel.

17. In a book covering machine, an endless book conveyor for supporting a plurality of books with their backs exposed, abutment means provided on said book conveyor at equally spaced intervals for engagement with one end of said books, a timing shaft, a timing wheel having its periphery disposed substantially tangential to the back of any books carried by said book conveyor, said timing wheel being secured to said timing shaft and formed with equally spaced drip grooves in the outer periphery thereof arranged to receive glue drippings from the rearward edges of books being covered, a pair of cover carrier wheels mounted on said timing shaft on opposite sides of said timing wheel, stop lugs provided on said cover carrier wheels for engagement with the forward edges of covers, endless belts for holding covers in position upon said cover carrier wheels prior to mounting of said covers upon the exposed backs of the books by means of said timing wheel, a driving shaft, a roll frame journaled on said driving shaft, a driven shaft journaled on the free end of said roll frame, a pair of gluing rolls secured to said driven shaft arranged to apply parallel rows of glue to covers carried by said carrier wheels, means for driving said driving shaft in timed relation with said timing shaft, means for driving said driven shaft from said driving shaft, electromagnetic means for moving the gluing rolls carried by said roll frame out of glue applying position with respect to said timing wheel, and spring means for moving said roll frame into operative gluing position with respect to said timing wheel.

ELMER E. WENDT.

REFERENCES CITED

The following references are of record in the file of this patent:

UNITED STATES PATENTS

| Number | Name | Date |
|---|---|---|
| Re. 14,560 | Pachter | Dec. 10, 1918 |
| 1,244,861 | Juengst | Oct. 30, 1917 |
| 2,162,773 | Bronander | June 20, 1939 |
| 2,210,567 | Carroll | Aug. 8, 1940 |
| 2,162,889 | Hormel | June 20, 1939 |
| 1,193,395 | Juengst | Aug. 1, 1916 |
| 1,389,762 | Juengst | Sept. 6, 1921 |
| 199,625 | Dooley | Jan. 29, 1878 |
| 768,734 | Clark | Aug. 30, 1904 |
| 1,196,091 | Emery | Aug. 29, 1916 |
| 2,094,349 | Carlson | Sept. 28, 1937 |